United States Patent
Lindberg

(10) Patent No.: US 10,700,877 B2
(45) Date of Patent: Jun. 30, 2020

(54) AUTHENTICATION OF A NEW DEVICE BY A TRUSTED DEVICE

(71) Applicant: Axis AB, Lund (SE)

(72) Inventor: Mikael Lindberg, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/725,706

(22) Filed: Oct. 5, 2017

(65) Prior Publication Data

US 2018/0102906 A1 Apr. 12, 2018

(30) Foreign Application Priority Data

Oct. 7, 2016 (EP) .................................. 16192717

(51) Int. Cl.
| | |
|---|---|
| *H04L 29/06* | (2006.01) |
| *H04L 9/32* | (2006.01) |
| *G06F 21/44* | (2013.01) |
| *G06F 21/45* | (2013.01) |
| *G06F 21/34* | (2013.01) |
| *G06F 21/72* | (2013.01) |

(52) U.S. Cl.
CPC ............ *H04L 9/3271* (2013.01); *G06F 21/44* (2013.01); *G06F 21/45* (2013.01); *H04L 63/0853* (2013.01); *G06F 21/34* (2013.01); *G06F 21/72* (2013.01); *G06F 2221/2103* (2013.01); *G06F 2221/2129* (2013.01); *H04L 9/321* (2013.01)

(58) Field of Classification Search
CPC .. H04W 12/06; H04L 9/3271; H04L 63/0853; H04L 9/321; G06F 21/44; G06F 21/45; G06F 21/34; G06F 21/72; G06F 2221/2129; G06F 2221/2103
See application file for complete search history.

(56) References Cited

U.S. PATENT DOCUMENTS

| | | | |
|---|---|---|---|
| 2005/0140787 A1* | 6/2005 | Kaplinsky | ........ G08B 13/19656 348/207.1 |
| 2006/0181395 A1* | 8/2006 | Gruszynski | ........ G06K 7/10217 340/10.51 |
| 2007/0223685 A1* | 9/2007 | Boubion | ................. G06F 21/31 380/2 |
| 2009/0083833 A1* | 3/2009 | Ziola | ....................... G06F 21/31 726/2 |

(Continued)

FOREIGN PATENT DOCUMENTS

| | | |
|---|---|---|
| WO | 2007116368 A1 | 10/2007 |
| WO | 2015135305 A1 | 9/2015 |

OTHER PUBLICATIONS

"Source Camera Identification Based on CFA Interpolation", Bayram et al., IEEE International Conference on Image Processing ICIP 2005 (Genova, Italy); Sep. 14, 2005.

(Continued)

*Primary Examiner* — Yogesh Paliwal
(74) *Attorney, Agent, or Firm* — Volpe and Koenig, P.C.

(57) ABSTRACT

A method, computer program, apparatus, and system for authentication of devices in a network of devices, and more specifically to a challenge-response authentication in which one trusted device presents a question ("challenge") and another party must provide a valid answer ("response") to be authenticated. The challenge includes processing data by an application specific integrated circuit (ASIC).

13 Claims, 3 Drawing Sheets

(56) References Cited

U.S. PATENT DOCUMENTS

| | | | |
|---|---|---|---|
| 2009/0258690 A1* | 10/2009 | Tarantino | G07F 17/32 |
| | | | 463/13 |
| 2010/0293612 A1* | 11/2010 | Potkonjak | G06F 21/34 |
| | | | 726/20 |
| 2011/0117881 A1 | 5/2011 | Luoma et al. | |
| 2012/0070029 A1 | 3/2012 | Muriello et al. | |
| 2012/0195476 A1 | 8/2012 | Bayram et al. | |
| 2013/0117834 A1 | 5/2013 | Ishioka | |
| 2014/0010774 A1 | 1/2014 | Lem | |
| 2014/0298368 A1* | 10/2014 | Raman | H04N 21/25816 |
| | | | 725/25 |
| 2016/0094551 A1 | 3/2016 | Sugihara et al. | |

OTHER PUBLICATIONS

"Hardware Architecture for Video Authentication Using Sensor Pattern Noise", Pande et al., IEEE Transactions on Circuits and Systems for Video Technology; vol. 24, Issue: 1, Jan. 2014; pp. 157-167.

EP 16192717.3 European Search Report (dated Apr. 20, 2017).

* cited by examiner

AUTHENTICATION OF A NEW DEVICE BY A TRUSTED DEVICE

FIELD OF INVENTION

The invention relates generally to authentication of devices in a network of devices, and more specifically to a challenge-response authentication in which one trusted device presents a question ("challenge") and another party must provide a valid answer ("response") to be authenticated.

BACKGROUND

Network connected devices are getting more and more common. In many applications, it is vital for security reasons that the origin, hardware and functionality of new devices in a network are known and controlled. This has brought with it new issues and challenges concerning authentication of new devices in the network. There exist many cryptographic solutions to the problem of secure authentication of devices in such networks. However, such solutions rely on distribution of cryptographic keys, which may result in logistical security problems.

There is thus a need for improvements within in this area. There exists the need to solve or at least reduce one or several of the drawbacks discussed above.

SUMMARY

According to a first aspect, a method performed by a trusted device for authentication of a new device is disclosed. The method comprises retrieving authentication data, transmitting the authentication data and a set of processing parameters to the new device, generating processed authentication data by processing the authentication data using an application specific integrated circuit, ASIC, of the trusted device and the set of processing parameters, authenticating the new device only if a response from the new device is received, wherein the response comprises data, and a difference between the processed authentication data and the data comprised in the response does not exceed a threshold difference.

By the term "trusted device" should, in the context of present specification, be understood a device that has already been authenticated and known to be reliable, e.g., within a network of connected devices.

By the term "authentication data" should, in the context of present specification, be understood a set of values that can be processed using the ASIC. Such data is preferably generated such that it is different each time it is retrieved, e.g., using a (pseudo) random function of some sort.

By the term "ASIC" should, in the context of present specification, be understood a specially designed computer chip that is customized for a particular use (e.g. to process specific data in a specific way).

ASICs as used in this context may provide operations (processing of data) which are not easily reproducible unless the hardware design of the ASIC is known. In a network where some or all connected devices each should have an ASIC with the same hardware design, this may advantageously be used as equivalent to a cryptographic mechanism when authenticating a new device. When determining the authenticity of a new device, the trusted device will send a challenge to the new device, asking it to perform operations on the authentication data using its ASIC and a set of processing parameters. If a response is received from the new device, data comprised in that response may be compared to an expected result. The trusted device knows the expected result since it has already generated such result by processing the authentication data using its own ASIC and the same set of processing parameters that was sent to the new device. Provided that a difference between the processed authentication data and the data comprised in the response does not exceed a threshold difference, the new device may be authenticated and thus trusted by the trusted device (and any other device already connected to, and trusted by, the trusted device). The allowed threshold difference may be predetermined and for example be expressed as an allowed number of bits (e.g. Hamming distance, or the L2-norm) that can differ between the data of the response and the processed authentication data. Other ways of determining difference between two set of data may be employed such as analysis of variance (ANOVA), correlation, covariance, histogram analysis, comparing length of data (number of bits in the data of the response and the processed authentication data) etc. In other embodiments, the allowed difference may vary from time to time. For example, if the connection (Wi-Fi, wired etc.) between the trusted device and the new device is unstable, the allowed difference may be larger to allow for missing bits in the received response from the new device.

According to some embodiments, the new device is authenticated only if a response from the new device is received, wherein the response comprises data, the response is received within a threshold time span from transmitting the authentication data and the set of processing parameters to the new device, and a difference between the processed authentication data and the data comprised in the response does not exceed a threshold difference.

Using an ASIC having a specific hardware design and functionally, i.e. designed for processing a specific type of data in a specific way, for processing the authentication data may be computationally expensive to reproduce for a device not having access this type of ASIC. This means that even if a fraud device (i.e. a device which tries to act as a device that should be trusted) somehow knows how the data received in the challenge from the trusted device should be processed, it will be very hard to make such processing at the same speed as the ASIC of a "true" trusted device. For this reason, the trusted device may also measure the time it takes for the response to be received and compare the response time to a threshold time span based on how long it should take for a true trusted device to process the authentication data. This threshold time span may be predetermined, or based on the time it took for the trusted device to generate the processed authentication data. The threshold time span may also be based on data about the network (connection between the trusted device and the new device), e.g., bit rates etc. So even if the new device responds correctly to the challenge from the trusted device, it is also required that the response is received from the new device within a specific time span for the new device to be authenticated.

According to some embodiments, the method comprises further authentication processes between the trusted device and new device. The above discussed embodiments (and also embodiments discussed below) may be only part of the authentication process. In case the new device responds to the challenge of the trusted the device in a correct way, the new device may according to some embodiments requires further authentication from the new device in order to trust it, for example using certificates or other known security measures. This embodiment is known as multi-factor authentication.

According to some embodiments, the ASIC is selected from the group comprising: an image processing pipeline, video analytics pipeline and an audio processing pipeline. By using proprietary ASIC IP such as an image processing pipeline, video analytics pipeline or an audio processing pipeline for processing the authentication data, it is very difficult for a fraud device to replicate a correct response to a challenge.

According to some embodiments, the step of retrieving the authentication data comprises reading the authentication data from a computer memory of the trusted device. The authentication data may be generated at the trusted device by a random function, or the memory may comprise a set of authentication data from which one is selected for each authentication process.

According to some embodiments, the trusted device is a camera, wherein the step of retrieving the authentication data comprises capturing image data using an image sensor of the camera and using at least parts of the image data as the authentication data. Image data may be considered as random data since two captured images never will be identical due to the presence of image noise.

According to some embodiments, the ASIC comprises a first version number, wherein the response received from the new device comprises a second version number, wherein the method further comprises: determining the threshold difference based on the first version number and the second version number. Different versions of proprietary ASIC may have different numerical accuracy when processing data. Consequently, to allow for different ASIC versions among trusted devices, it may be advantageous to adapt the threshold difference based on a comparison of version numbers of the trusted device and the new device. Typically, differing version numbers of the trusted device and the new device may result in a higher allowed difference between the processed authentication data of the trusted device and the data comprised in the received response.

According to some embodiments, the ASIC comprises a first version number, wherein the response received from the new device comprises a second version number, wherein the method further comprises: determining the threshold time span based on the first version number and the second version number. For the same reasons as above, a lower version number of an ASIC may result in a different processing speed of data. For example, an ASIC of an older version may process data more slowly compared to an ASIC of a newer version. According to other embodiments, an ASIC of a newer version may process data in a different way compared to an ASIC of an older version, which may result in a slower processing speed.

In a second aspect, a device configured to authenticate a new device is disclosed. The device comprises an application specific integrated circuit, ASIC, a processor configured to retrieve authentication data, and generate processed authentication data by processing the authentication data using the ASIC and a set of processing parameters, and a digital network module configured to transmit the authentication data and the set of processing parameter to the new device, and to receive a response from the new device, wherein the processor is configured to authenticating the new device only if a response from the new device is received by the digital network module, wherein the response comprises data, and a difference between the processed authentication data and the data comprised in the response does not exceed a threshold difference.

According to some embodiments, the processor is configured to authenticating the new device only if a response from the new device is received by the digital network module, wherein the response comprises data, the response is received within a threshold time span from transmitting, by the digital network module, the authentication data and the set of processing parameters to the new device, and a difference between the processed authentication data and the data comprised in the response does not exceed a threshold difference.

According to some embodiments, the device of the second aspect is a network camera.

In a third aspect, a device is disclosed where the device comprises a digital network module configured to receive a challenge from a second device, the challenge comprising authentication data and a set of processing parameter, an application specific integrated circuit, ASIC, a processor configured to generate processed authentication data by processing the authentication data using the ASIC and the set of processing parameters, wherein the digital network module being further configured to transmit a response to the challenge to the second device, the response comprising the processed authentication data According to some embodiments, the device of the third aspect is a network camera.

In a fourth aspect, a system comprising the trusted device of the second aspect and the device of the third aspect is disclosed.

In a fifth aspect, a computer program product comprising a computer-readable storage medium with instructions adapted to carry out the method of the first aspect when executed by a device having processing capability is disclosed.

The second, third, fourth and fifth aspect may generally have the same features and advantages as the first aspect.

BRIEF DESCRIPTION OF THE DRAWINGS

A more detailed understanding may be had from the following description, given by way of example in conjunction with the accompanying drawings where.

DETAILED DESCRIPTION

Figure 1:
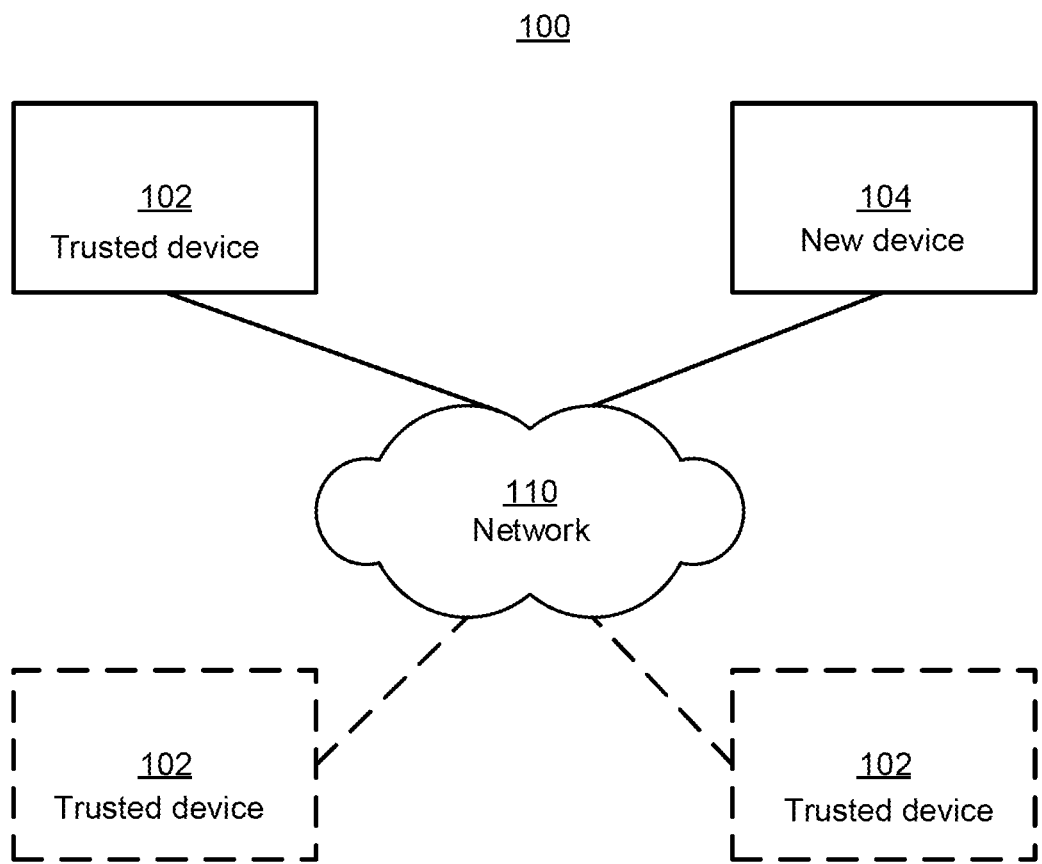
FIG. 1 shows a system of devices according to embodiments.

FIG. 1 shows a system 100 of devices 102, 104, connected to each other via a network 110. The connection may be wired or wireless, and the devices may be connected through e.g. a local area network or Internet. According to some embodiments, the devices 102, 104 are connected via a peer-to-peer network, i.e., where interconnected devices ("peers") share resources amongst each other without the use of a centralized administrative system. The devices 102, 104 may for example be image or video recording devices (video camera, network camera etc.), audio recording devices (microphones) etc. The system 100 comprises one or more trusted devices 102, i.e., devices 102 which already been authenticated in some way and thus is known and reliable, e.g. within the network 100. In FIG. 1, a new device (untrusted device, unauthenticated device etc.) 104 has connected to the network 100. The present disclosure relates to how such new device 104 should be authenticated such that it may be reliable within the network 100. Determining if a new device 104 is authentic may be important for a number of reasons, for example to determine if data received from the new device 104 is authentic and can be trusted, or to determine if the new device 104 is a genuine device of a specific brand or type, or if it is an imposter device which cannot be trusted.

In the below embodiments, the devices 102, 104 are exemplified as video recording devices or network cameras, but as understood by the skilled person, other devices such as audio recording devices or any other device having an application specific integrated circuit, ASIC, may be employed.

Figure 2:
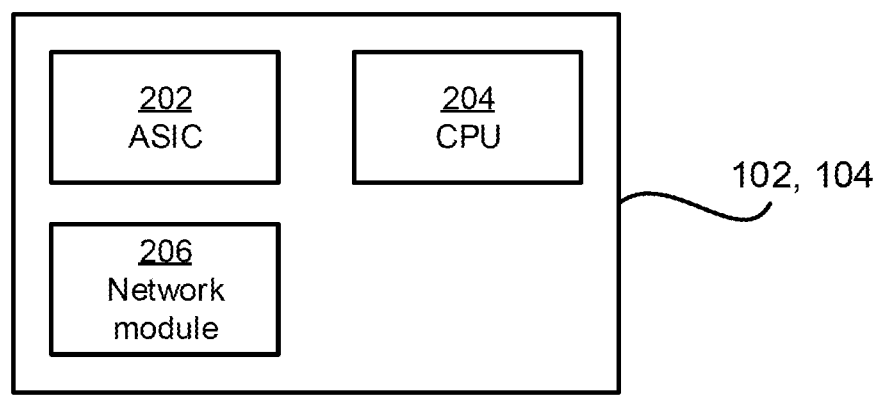
FIG. 2 shows a device of the system in FIG. 1 according to embodiments.

FIG. 2 shows by way of example a design of a device 102, 104. The device 102, 104 comprises an ASIC 202, a processor (e.g. a central processing unit, CPU) 204 and a network module 206 such that it can be connected via Wi-Fi, Internet etc. The ASIC 202 may include any application specific integrated circuit, for example an image processing pipeline (IPP), video analytics pipeline and an audio processing pipeline. According to embodiments, the ASIC 202 comprises also the processor 204 and the network module. Since an ASIC 202 is designed for a specific reason, e.g. to process a specific type of data in a specific way, it may be very difficult to copy such IC. In many cases, fingerprints (processed data) may uniquely identify an ASIC of a specific type. For example, the IP (Image Processing) blocks which according to embodiments are part of an ASIC may provide operations which are computationally expensive to reproduce if such ASIC is not used, and not easily reproducible unless the hardware designs are known. The hardware design of an ASIC is often kept a secret by the company developing the ASIC, since a lot of research typically is put into such an integrated circuit.

An embodiment of a method for authenticating a new device by a trusted device will now be described in conjunction with FIGS. 3 and 4.

The authentication process starts S402 when the new device 104 is somehow discovered by the trusted device 102. The new device may for example multicast 302 its ID within a peer-to-peer network. The new device 104 may also directly transmit a request 302 for authentication to the trusted device 102, the request may comprise the identity (ID) of the new device. The trusted device 102 may according to some embodiments discover the new device 104 on the network and request 302 an identity from the new device 104.

Figure 3:
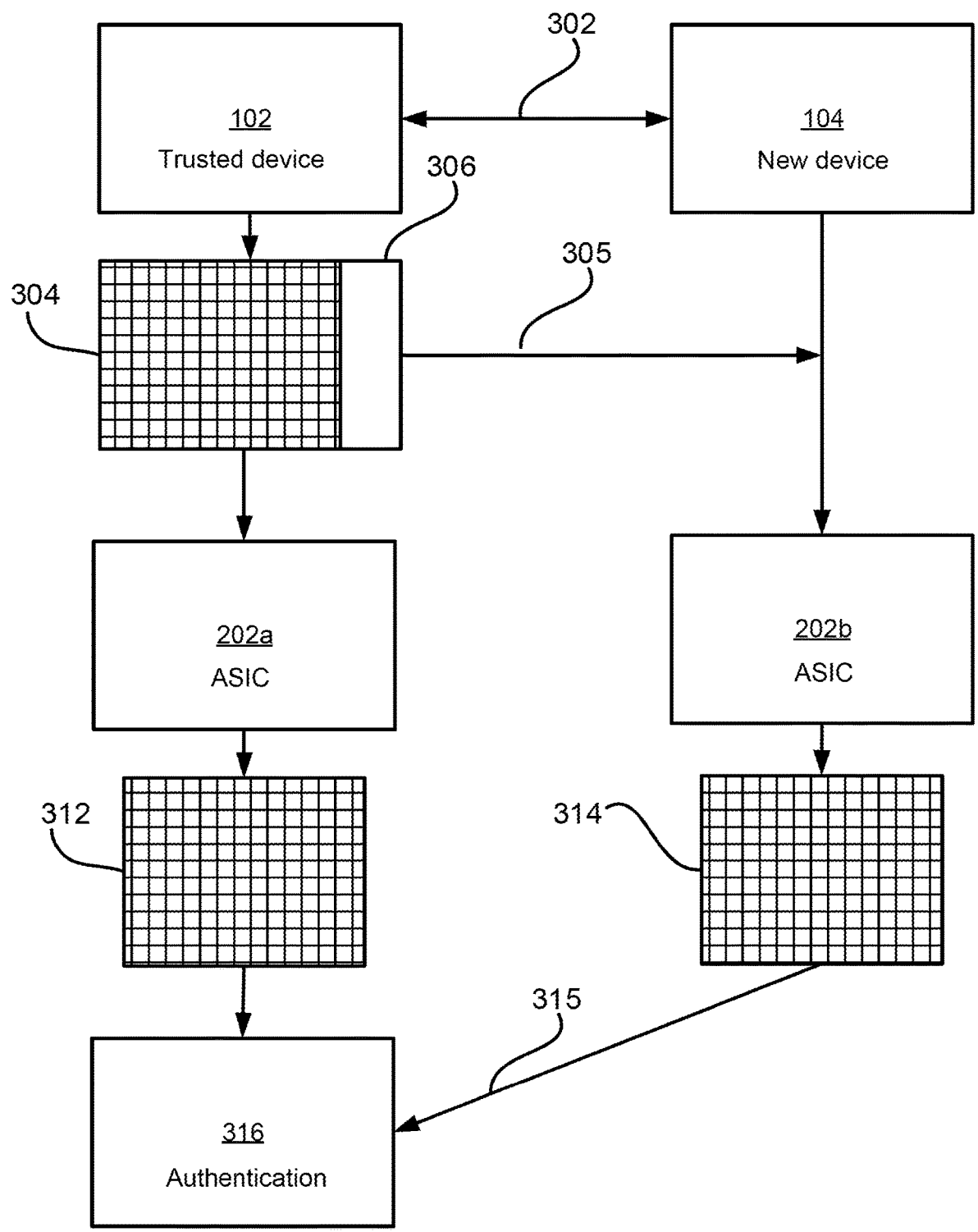
FIG. 3 shows a schematic authentication process between a trusted device and a new device.

It should be noted that in the example embodiment of FIG. 3, it is the trusted device 102 performing the authentication that discovers the new device 104. However, according to some embodiments, it is another trusted device 102 of the network (e.g. one of the dashed devices 102 of FIG. 1) that discovers the new device 102 and then asks another trusted device 102 to perform the authentication. This may be advantageous in case several types or versions of trusted devices 102 are connected in the network, and the trusted device 102 that actually discover the new device 104 is not the best option for performing the authentication due to the fact that it is of a different type or version compared to the new device 104. In other scenarios, the trusted device 102 discovering the new device 104 may be occupied with other tasks and for that reason may ask another trusted device 102 within the network to perform the authentication.

When the authentication process has been initiated S402, the trusted device may retrieve S404 authentication data 304. The retrieval of authentication data 304 may comprise reading authentication data from a memory of the trusted device, requesting authentication data from an authentication data repository separate from the trusted device, generating the authentication data at the trusted device 102 e.g. using a random function etc. In case the trusted device 102 is a camera or a microphone, an image/audio sensor of the trusted device 102 may be used for generating the authentication data 304, e.g. capturing an image or video sequence (image data), or recording audio data. In FIG. 3, the authentication data 304 is exemplified as a matrix of data, e.g., an image, The authentication data 304 and a set of processing parameters 306 will be used for authentication of the new device using the ASIC 202*a* of the trusted device 102 and any corresponding ASIC 202*b* of the new device 104. The processing parameters 306 depends on what type of ASIC that is used for authentication. By way of example, if the ASIC 202*a* is an IPP, the processing parameters 306 may for example relate to noise filtering, color compensation, edge detection etc. If the ASIC 202*a* is a video analytics pipeline, the processing parameters 306 may relate to motion detection, face detection etc. If the ASIC 202*a* is an audio processing pipeline, the processing parameters 306 may relate to gain levels of certain frequencies etc.

The authentication data 304 and a set off processing parameters 306 are transmitted S406 to the new device 104. The trusted device 102 may, at the same time, or before or after the transmission S406, process the authentication data 312 using the ASIC 202*a* (configured with the processing parameters 306) to generate processed authentication data 312.

In the example of FIG. 3, it is the trusted device 102 performing the authentication (as will be described below) that also generate the processed authentication data 312. However, it is envisaged that the processed authentication data 312 is generated by another device separate from the trusted device 102. In this embodiment, the trusted device 102 transmits the authentication data 304 and the set of processing parameters 306 to the separate device, which generates the processed authentication data 312 using an ASIC 202 and then transmits the processed authentication data 312 to the trusted device 102 that then completes the authentication process.

The processed authentication data 312 will then be used as a key for determining or assessing the authenticity of the new device. This is may be done as follows.

When the authentication data 304 and a set off processing parameters 306 are transmitted (in a challenge 305) to the new device 104, a response 315 is expected to be received at the trusted device 102 (e.g. via the network module 206 of the trusted device 102). In case such response 315 is not received, the trusted device may determine that the new device 104 cannot be trusted, since it was not set up to transmit a response 315 to the challenge 305. According to some embodiment, the trusted device may retransmit the challenge 305 a number of times, to ensure that a transmission error was not the reason for not receiving a response 315 at the trusted device 102.

However, if a response 315 to the challenge 305 is received, the new device 104 may be a reliable device. The new device may in this case comprise a digital network module 206 configured to receive the challenge 305 from the trusted device 102. The new device 104 may also comprise an ASIC 202*b* and a processor configured to generate processed authentication data 314 by processing the authentication data of the challenge 305 using the ASIC 202*b* and the set of processing parameters of the challenge 305. The processed authentication data 314 may then be transmitted in the response 315 to the trusted device 102. As set out above, it may be very difficult to forge the processed authentication data (fingerprint) in case the new device 104 does not comprise an ASIC as a "true" trusted device should.

Furthermore, the trusted device may determine S412, in an authentication stage 316 at the trusted device 102, if the difference between the processed authentication data 312 and data 314 in the response 315 is less than (does not exceed) a threshold difference. In case the threshold difference is exceeded, the trusted device may determine S416 that the new device will not be authenticated.

The threshold difference may be predetermined, or it may be based on the authentication data (e.g. size, type of data etc.). According to some embodiments, the ASIC of devices in the network may have different version numbers (be of different generations etc.). If this is the case, the threshold difference may need to be set based on the version numbers the two ASICs 202a, 202b. Consequently, according to some embodiments, the ASIC 202a of the trusted device 102 comprises a first version number, and the response 315 received from the new device 104 comprises a second version number (i.e. the version number of the ASIC 202b of the new device). In this embodiment, the trusted device (e.g. the authentication stage 316 of a processor 204 of the trusted device 102) may be configured to determine the threshold difference based on the first version number and the second version number. For example, an ASIC of a lower version number may have a reduced numerical accuracy compared to an ASIC of a higher version number which thus may require that the threshold difference is increased compared to if ASICs of the same version number is used.

According some embodiments, also the time it takes for the new device to produce a response 315 to the challenge 305 is used for authentication. As set out above, mimicking an ASIC using e.g. software requires substantial computational resources. This means that even if a fraud device somehow knows how to forge the fingerprint of an ASIC of a "true" trusted device, the time span of producing the processed authentication data using software may be substantially longer compared to using an ASIC 202. This knowledge may advantageously be used in the authentication process. According to this embodiment, the trusted device 102 checks S414 if the response 315 is received within a threshold time span from transmitting the challenge 305 (the authentication data 304 and the set of processing parameters 306) to the new device 104. In this embodiment, in case the response is not received within the threshold time span, the trusted device 102 may determine S416 that the new device 104 will not be authenticated. Similar to the threshold difference, the threshold time span may be predetermined, or it may be based on the authentication data (e.g. size, type of data etc.). In some embodiments, the threshold time span further depends on properties of the network such as bitrates etc. Moreover, similar to the threshold difference, the threshold time span may need to be set based on differing version numbers the two ASICs 202a, 202b. In this embodiment, the trusted device (e.g. the authentication stage 316 of a processor 204 of the trusted device 102) may be configured to determine the threshold timespan based on the first version number and the second version number. For example, an ASIC of a lower version number may have a reduced processing capability compared to an ASIC of a higher version number which thus may require that the threshold time span is increased compared to if ASICs of the same version number is used.

Figure 4:
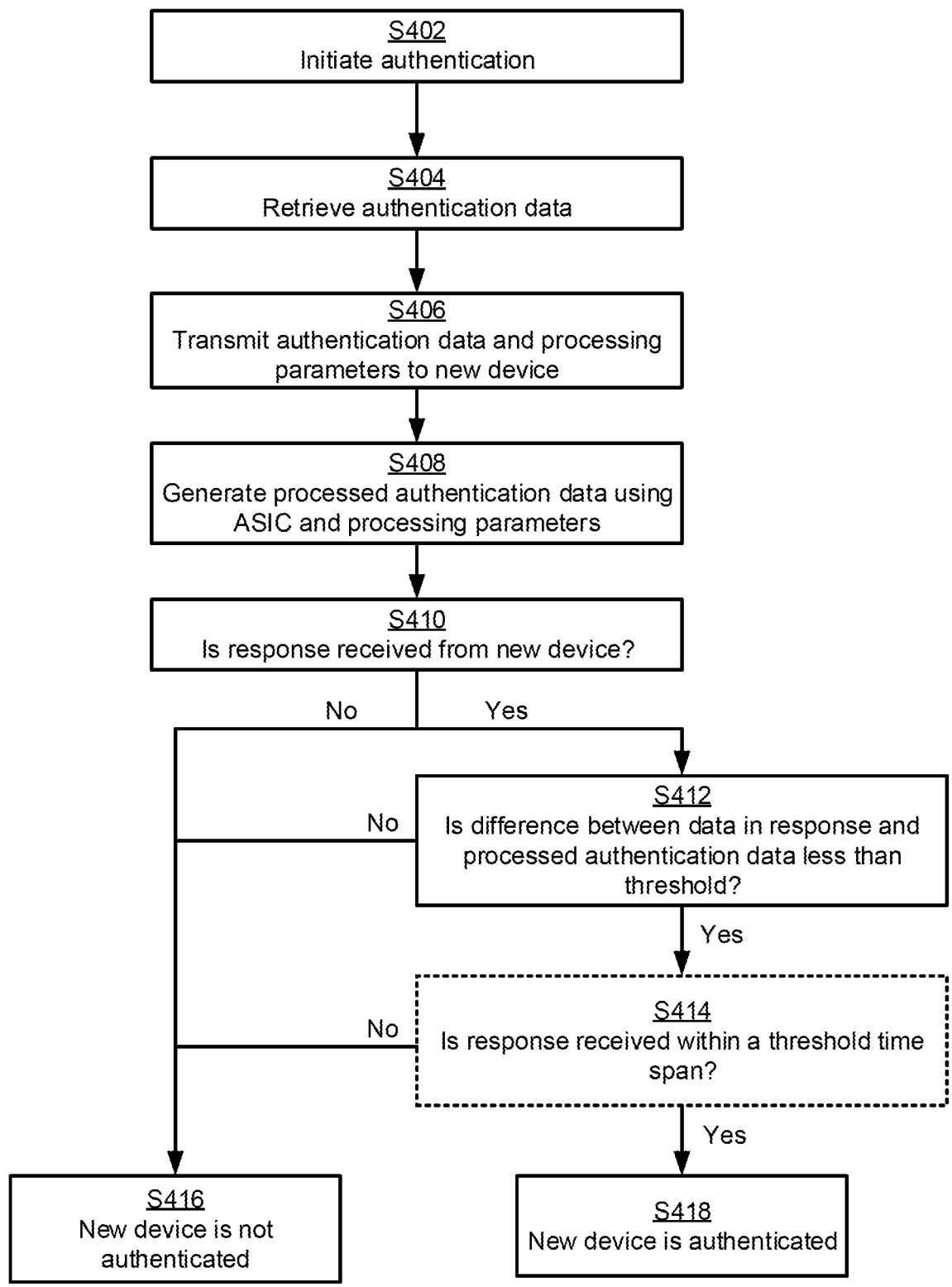
FIG. 4 shows a method performed by a trusted device for authentication of a new device according to embodiments.

In FIG. 4, in case the threshold difference, and in some embodiments the threshold time span, is not exceeded, the trusted device determines S418 that the new device is authenticated. However, according to some embodiments, the authentication process of FIGS. 3 and 4 is only part of a larger, multi-factor authentication. Consequently, in case the new device fulfils the challenge-response authentication of FIGS. 3 and 4, further authentication processes may be initiated, such as a certificate based authentication process. However, if the new device does not correctly respond to the challenge 305, no further authentication processes may be needed and the trusted device may directly determine S416 that the new device 104 will not be authenticated and thus not trusted.

The systems and methods disclosed hereinabove may be implemented as software, firmware, hardware or a combination thereof. In a hardware implementation, the division of tasks between functional units or stages referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit (ASIC). Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and that can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. A method performed by a trusted device for authentication of a new device, the trusted device being a camera and comprising a sensor, the method comprising:
retrieving authentication data, wherein retrieving the authentication data comprises capturing image or audio data by the sensor and using at least part of the image or audio data as the authentication data;
transmitting the authentication data and a set of processing parameters to the new device;
generating processed authentication data by processing the authentication data using an application specific integrated circuit (ASIC) of the trusted device and the set of processing parameters, wherein the processed authentication data is used to authenticate the new device; and
authenticating the new device only if:
a response from the new device is received, wherein the response comprises data; and
a difference between the processed authentication data and the data comprised in the response does not exceed a threshold difference.

2. The method of claim 1, wherein the new device is authenticated only if:
   a response from the new device is received, wherein the response comprises data;
   the response is received within a threshold time span from transmitting the authentication data and the set of processing parameters to the new device; and
   a difference between the processed authentication data and the data comprised in the response does not exceed a threshold difference.

3. The method of claim 2, wherein the ASIC comprises a first version number, wherein the response received from the new device comprises a second version number, wherein the method further comprises determining the threshold time span based on the first version number and the second version number.

4. The method of claim 1, wherein the method comprises further authentication processes between the trusted device and new device.

5. The method of claim 1, wherein the ASIC is selected from the group comprising: an image processing pipeline, video analytics pipeline and an audio processing pipeline.

6. The method of claim 1, wherein the retrieving the authentication data comprises reading the image or audio data from the computer memory of the trusted device.

7. The method of claim 1, wherein the sensor is an image sensor, wherein the retrieving the authentication data comprises capturing image data by the image sensor and using at least part of the image data as the authentication data.

8. The method of claim 1, wherein the ASIC comprises a first version number, wherein the response received from the new device comprises a second version number, wherein the method further comprises determining the threshold difference based on the first version number and the second version number.

9. A device configured to authenticate a new device, the device being a camera, the device comprising:
   a sensor configured to capture image or audio data;
   a computer memory;
   an application specific integrated circuit (ASIC);
   a processor configured to:
      retrieve authentication data, wherein the processor is configured to retrieve the authentication data by reading image or audio data captured by the sensor and using at least part of the image or audio data as the authentication data; and
      generate processed authentication data by processing the authentication data using the ASIC and a set of processing parameters,
      wherein the processed authentication data is used to authenticate the new device; and
   a digital network transceiver configured to transmit the authentication data and a set of processing parameter to the new device, and to receive a response from the new device,
   wherein the processor is configured to authenticating the new device only if:
      a response from the new device is received by the digital network transceiver, wherein the response comprises data; and
      a difference between the processed authentication data and the data comprised in the response does not exceed a threshold difference.

10. The device of claim 9, wherein the processor is configured to authenticating the new device only if:
   a response from the new device is received by the digital network transceiver, wherein the response comprises data;
   the response is received within a threshold time span from transmitting, by the digital network transceiver, the authentication data and the set of processing parameters to the new device; and
   a difference between the processed authentication data and the data comprised in the response does not exceed a threshold difference.

11. The device of claim 9, wherein the camera is a network camera.

12. A system comprising:
   a device, wherein the device is a camera; and
   a new device,
   wherein the device comprises:
      a sensor configured to capture image or audio data;
      a computer memory;
      an application specific integrated circuit (ASIC);
      a processor configured to:
         retrieve authentication data, wherein the processor is configured to retrieve the authentication data by reading image or audio data captured by the sensor and using at least part of the image or audio data as the authentication data; and
         generate processed authentication data by processing the authentication data using the ASIC and a set of processing parameters, wherein the processed authentication data is used to authenticate the new device; and
      a digital network transceiver configured to transmit the authentication data and a set of processing parameter to the new device, and to receive a response from the new device,
      wherein the processor is configured to authenticating the new device only if:
         a response from the new device is received by the digital network transceiver, wherein the response comprises data; and
         a difference between the processed authentication data and the data comprised in the response does not exceed a threshold difference; and
   wherein the new device comprises:
      a digital network transceiver configured to receive the authentication data and the set of processing parameter from the device;
      an ASIC; and
      a processor configured to generate processed authentication data by processing the authentication data using the ASIC and the set of processing parameters;
      wherein the digital network transceiver being further configured to transmit a response to the device, the response comprising the processed authentication data.

13. A computer program product comprising a non-transitory computer-readable medium having computer readable program code recorded thereon which, when executed on a device having a processing capability, the device being a camera comprising a sensor, causes the device to perform operations comprising:
   retrieving authentication data, wherein retrieving the authentication data comprises capturing image or audio data by the sensor and using at least part of the image or audio data as the authentication data;
   transmitting the authentication data and a set of processing parameters to the new device;

generating processed authentication data by processing the authentication data using an application specific integrated circuit (ASIC) of the trusted device and the set of processing parameters, wherein the processed authentication data is used to authenticate the new device; and authenticating the new device only if:
   a response from the new device is received, wherein the response comprises data; and
   a difference between the processed authentication data and the data comprised in the response does not exceed a threshold difference.

\* \* \* \* \*